Feb. 20, 1962   J. T. RENSCH   3,021,971
ROCK DIGGER AND LOADER
Filed Oct. 6, 1958
2 Sheets-Sheet 1

INVENTOR
JOSEPH T. RENSCH
BY
Williamson, Schroeder & Palmatier
ATTORNEYS

INVENTOR
JOSEPH T. RENSCH
BY
Williamson, Schroeder & Palmatier
ATTORNEYS

United States Patent Office 3,021,971
Patented Feb. 20, 1962

3,021,971
ROCK DIGGER AND LOADER
Joseph T. Rensch, Box 27, Makoti, N. Dak.
Filed Oct. 6, 1958, Ser. No. 765,617
1 Claim. (Cl. 214—147)

This invention relates to a rock digging and picking device and more particularly to a rock digging and picking attachment for a mobile power implement.

The present application is a continuation-in-part of U.S. application Ser. No. 542,017, filed October 21, 1955, now abandoned.

An object of my invention is to provide a new and improved rock digging and picking attachment of simple and inexpensive construction and operation which is adapted for use with a mobile power implement.

Another object of my invention is to provide as an attachment for a mobile power implement, a device for engaging and securely gripping rocks buried below the ground surface with a multiplicity of tines on each side of the rock to facilitate removing the rock from the ground.

A further object of my invention is the provision of an attachment for a tractor and the like which drivably projects a multiplicity of jaw-forming tines into the ground for engaging and securely gripping a rock in the ground without necessitating moving of the rock and successively removing the rock from the ground.

These and other objects and advantages of my invention will more fully appear from the following description made in connection with the accompanying drawings wherein like reference characters refer to the same parts throughout the several views and in which:

FIG. 1 is a side-elevational view partially broken away of a tractor with one wheel removed with the rock digger and loader of the present invention secured thereon, showing in full lines the tines of the digger and loader in a vertical position surrounding a rock which has been dug, and showing in dotted lines the tines in a generally horizontal raised position, the rock being shown in dotted lines also;

Figure 1:
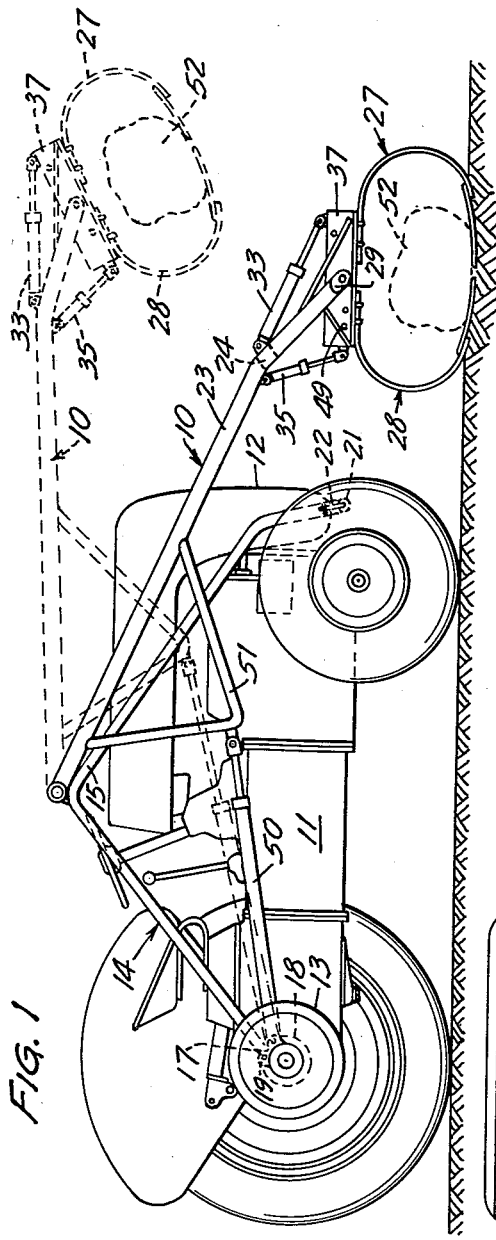
Figure 2:
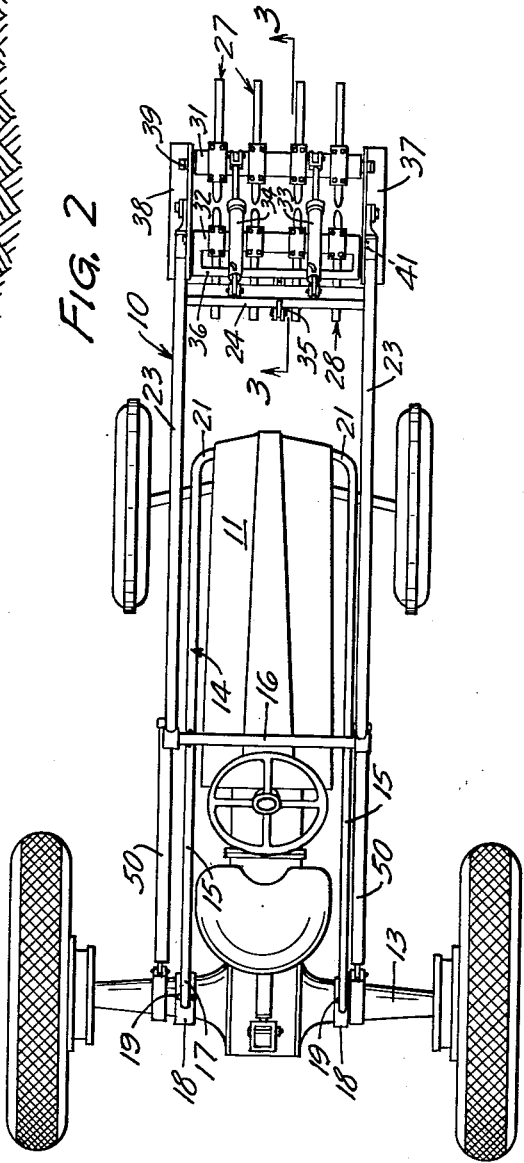
FIG. 2 is a top plan view partially broken away.

Referring in greater detail to the drawings in which like numerals indicate like parts throughout the several views, the rock digger and loader of the present invention is indicated generally by the reference numeral 10 and is for use with a tractor shown in FIGS. 1 and 2 and indicated by the reference numeral 11, the tractor 11 having a frame 12 and a rear axle housing 13. The rock digger and loader 10 comprises an upright frame indicated generally by the reference numeral 14 and including a pair of bars 15 arranged in parallel spaced relation and connected together at their apexes by a crossbar 16. Means is carried by each one of the adjacent ends 17 of the bars 15 of the frame 14 adapted to secure the bars 15 to the rear axle housing 13 of the tractor 11 and consists of a pair of collars 18 one on each end portion of the rear axle housing 13. A bolt 19 secures each bar end 17 to the adjacent collar 18. Means is provided on the other of the adjacent ends 21 of the bars 15 of the frame 14 adapted to secure the bars 15 to the frame 12 of the tractor 11 and consists of a bolt assembly 22, shown in dotted lines of FIG. 1.

A pair of support members or arms 23 are arranged in parallel spaced relation and are rigidly connected together intermediate their outer ends by means of a cross-tie 24, the arms being positioned longitudinally of the bars 15 of the frame 14 with one of their adjacent ends 25 connected to the crossbar 16, each of the arm ends 25 having a sleeve 26 receiving the adjacent end of the crossbar 16. The connection of each sleeve 26 to the crossbar 16 provides for rocking movement of the arms 23 about said crossbar as an axis.

Figure 3:
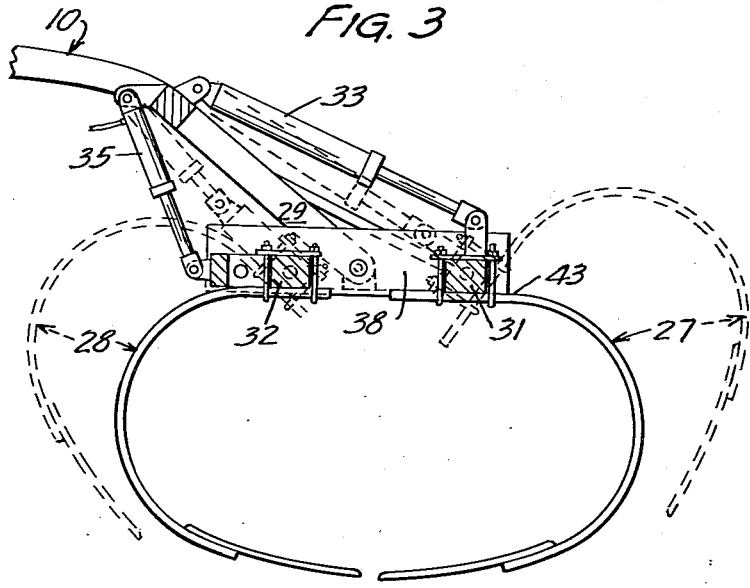
FIG. 3 is a detailed sectional view greatly enlarged taken on the line 3—3 of FIG. 2 showing in solid lines the vertical positions of the tines and showing in dotted lines the horizontal positions of the tines.
Figure 4:
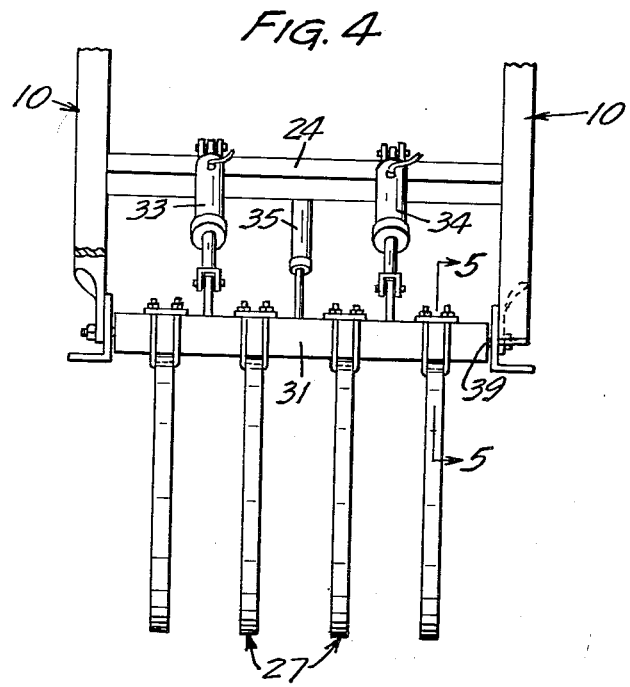
FIG. 4 is a front view partially broken away of the tine assembly with the tines in vertical position.

A pair of tine jaws formed of substantially vertically disposed tines are arranged in face-to-face spaced relation with respect to each other, the tine jaws being indicated by the reference numerals 27 and 28. The tine jaws 27 and 28 are positioned transversely of the portions of the arms 23 between the cross-tie 24 and the adjacent ends 29 of the arms 23 and have their upper ends connected to the arm portions for independent swinging movement from the vertical position to a horizontal position away from each other. The tines of each jaw are curved and the lower end portions of the tines arcuately formed about axes adjacent the swing axis of the respective jaw. The lower ends of the tines of each jaw extend toward and are disposed in substantially end to end relation with the tines of the other jaw. The tines of the jaws are constructed of high grade carbon steel and are therefore resiliently flexible, it being understood of course, that the tines may be formed of any other strong and resiliently flexible material. The lower ends of adjacent tines in each of the jaws are therefore movable relative to each other to facilitate engaging of rocks with a multiplicity of tines of each jaw. The means connecting the tine jaws 27 and 28 to the arm portions includes a pair of jaw supporting members 31 and 32 arranged in parallel spaced relation positioned transversely of the portions of the arms 23 between their ends 29 and the cross-tie 24, and each connected to the arm portions for independent limited rocking movement in clockwise and counterclockwise directions. The tines of the jaw 27 are arranged in parallel spaced relation and have their upper ends affixed to the support member 31 by U-bolts. Jaw support 31 is remote from the cross-tie 24 for movement from the vertical position shown in solid lines in FIG. 3 to a horizontal position shown in dotted lines swung forwardly of the support member 31 upon execution of the counterclockwise movement of the support member 31. The tines of the other jaw 28 are vertically disposed and are in parallel spaced relation with respect to each other and in face-to-face relation with respect to the tines of the other tine jaw 27 and are fixedly secured to the other support member 32 for swinging movement therewith.

Power driving means is provided operatively connected to each of the sets of tines 27 and 28 for selectively effecting their movements and consists of a first pair of hydraulic cylinders 33 and 34 each having one end pivotally connected to the cross-tie 24 and having its other end pivotally connected to the support member 31.

Another hydraulic cylinder 35 has one end connected to the cross-tie 24 and the other end connected to an extension 36 having its ends connected to the adjacent ends of the support member 32, the connection of the support members 31 and 32 to the portions of the arms between the ends 29 and the cross-tie 24 including side angle brackets 37 and 38 which are connected intermediate their ends to the arm portions and have holes receiving the trunnion 39 of support member 31 and holes for the reduced end portions 41 of the support member 32. The connection of the extension 36 to the support member 32 is rigid and causes rocking movement of the latter upon actuation of the hydraulic cylinder 35.

Holes 49 in the brackets 37 and 38 and in the legs of the extension 36 permit the insertion of an iron bar (not shown) to lock the support member 32 against rocking movement relative to the brackets 37 and 38. Suitable hydraulic conduits (not shown) connect each of the cylinders 33, 34, and 35, with the hydraulic system of the tractor 11 and control means (not shown) is provided for selectively admitting the hydraulic fluid of the tractor hydraulic system to the cylinders 33 and 34 and to the cylinder 35, selectively, so as to swing, for opening and closing, the tine jaws 27 and 28 independently of each other.

A hydraulic cylinder 50 is positioned on each side of the tractor and has one end pivotally connected to the rear axle housing 13 of the tractor and its other end pivotally connected to the lower end of an L-shaped strut 51 which has its ends secured to the adjacent arm 23 for raising and lowering the arms 23.

In operation the tractor is driven to locate the jaws 27 and 28 over the rock to be picked up. The arms 23 will then be lowered and the jaws 27 and 28 are swung away from each other into open position. When the jaws 27 and 28 are in proximity with the ground surface, they will be swung downwardly toward each other and the arms 23 will be held in a substantially stationary position. As the jaws are swung downwardly, the lower ends of the tines are forcibly projected into the ground surface on opposite sides of the rock in an attempt to get under the rock so as to pick it up substantially in the manner indicated in FIG. 1. Frequently however, a substantial portion of the rock is buried below the ground surface and the tines will project into the ground and will engage the sides of the unevenly contoured rock. It should be specifically pointed out that because the lower ends of the tines are curved and are arcuately formed about axes which are adjacent the swing axis of the corresponding jaw, the lower ends of the tines are projected into the ground without being moved transversely of the general line of travel of the tines when projected, and therefore the projection of the tines underneath rocks is made quite easy. As the tine jaws are projected into the ground, the lower ends of the tines engage the unevenly contoured rock and as additional pressure is applied on the tines by the hydraulic cylinders, the tines yield and permit a multiplicity of tines in each jaw to engage the rock. The rock is thereby supported and gripped at a multiplicity of points on its surface and the tines are substantially equally loaded in lifting the rock out of the ground. Because most rocks are evenly contoured it is extremely likely that one of the tine jaws will engage the rock before the other jaw engages the rock. The tine jaws are individually swingable and therefore the tines of both jaws may be swung into gripping engagement with the rock before the rock is moved. As a result it will be seen that a multiplicity of tines of each jaw cooperate in moving the rock. When the tine jaws have gripped the rock the arms 23 may be swung upwardly to remove the rock from the ground. It should additionally be understood that if the rock cannot be readily loosened the tractor may be moved slightly forwardly and rearwardly to loosen the rock. When the arms 23 have been swung upwardly the rock may be deposited on a pile or upon another vehicle by merely opening the jaws 27 and 28.

The unique construction of the present invention facilitates ready and easy digging of rocks which are actually embedded in the ground. With both of the jaws swung outwardly in the dotted line position shown in FIG. 3, the boom structure 10 is lowered by operation of cylinder 50 until the ends of the rear jaw tines engage the ground. Through operation of the cylinders 50 and 35, the tines of the rear jaw 28 may be projected into the ground and beneath the rock embedded therein. When this has been accomplished, then the cylinder 50 is operated to lift the boom structure 10 and simultaneously with the operation of cylinder 50, cylinder 33 is operated, causing the ends of the tines in jaw 27 to push downwardly against the ground, and therefore the lifting power of the cylinder 50 is augmented by the power supplied through cylinder 33 so that the tine jaw 28 will lift the rock and loosen it from its embedded position. The combined lifting power exerted through the operation of cylinders 50 and 33 is continued until the jaw 28 has lifted the rock to ground surface, at which time the tines of jaw 27 will no longer exert a lifting force, and the rock must be lifted through the operation of the cylinder 50 acting against the boom structure 10. Of couse it should be understood that after the rock has been brought up to ground level, and completely loosened, less power is needed and therefore the power supplied from cylinder 50 will be adequate. Operation of the invention in this manner is extremely important where large rocks and boulders are being removed and where rocks are being dug from solid bed rock. The application of equal pressures to cylinders 50 and 33 during the lifting operation may be accomplished through the use of a pressure equalizer, and this may be extremely important when the invention is being used in connection with enormous rocks which are exceedingly difficult to remove.

It will be seen that I have provided an new and improved rock digging and picking device wherein yieldable tines of cooperating jaws are supported on rigid mounting members of the tractor and may therefore be forcibly projected into the ground for engaging and gripping a rock with a multiplicity of tines of each jaw.

It will, of course, be understood that various changes may be made in the form, detail, arrangement and proportion of the parts without departing from the scope of my invention which consists of the matter described herein and set forth in the appended claim.

What I claim is:

A rock-digging and picking attachment for use with a tractor, comprising a pair of spaced and rigid elongate supporting members extending forwardly from the tractor and being vertically swingably mounted thereon about a first axis, power means connected with the supporting members for vertically swinging the same, supporting means at the outer ends of said supporting members, a pair of tine jaws carried in depending position by said supporting means and being swingable toward and away from one another on axes spaced from one another, said tine jaws each including a plurality of tines, said tines being resiliently flexible to facilitate engaging and gripping of unevenly contoured rocks with a multiplicity of tines of each jaw, said latter axes extending transversely of said supporting members and being substantially parallel with said first axis, the tine ends of each jaw extending toward the tine ends of the other jaw when the jaws are in closed position, a pair of individually controllable hydraulic cylinders each anchored to the supporting members and each being connected with a respective jaw for swinging the jaw toward and away from the other jaw into open and closed position, whereby the rearmost jaw may be projected downwardly into the ground against a rock and the foremost jaw may be subsequently moved downwardly into the ground, along with a simultaneous lifting on the supporting members to provide substantial lifting force on the rock and for rolling the rock out of the ground.

References Cited in the file of this patent
UNITED STATES PATENTS

| | | |
|---|---|---|
| 1,307,009 | Joy | June 17, 1919 |
| 2,488,767 | Drott | Nov. 22, 1949 |
| 2,591,431 | Henggeler | Apr. 1, 1952 |
| 2,651,424 | Johnson | Sept. 8, 1953 |